United States Patent
Döbele

(10) Patent No.: US 7,021,170 B2
(45) Date of Patent: Apr. 4, 2006

(54) GEAR-SHIFTING METHOD FOR MULTI-GROUP GEARBOXES

(75) Inventor: Bernd Döbele, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 58 days.

(21) Appl. No.: 10/492,881

(22) PCT Filed: Oct. 23, 2002

(86) PCT No.: PCT/EP02/11811

§ 371 (c)(1),
(2), (4) Date: Apr. 16, 2004

(87) PCT Pub. No.: WO03/036137

PCT Pub. Date: May 1, 2003

(65) Prior Publication Data

US 2004/0261556 A1 Dec. 30, 2004

(30) Foreign Application Priority Data

Oct. 25, 2001 (DE) ............... 101 52 857

(51) Int. Cl.
*F16H 3/02* (2006.01)
*F16H 59/00* (2006.01)
*B60K 41/04* (2006.01)

(52) U.S. Cl. ............ 74/335; 74/745; 477/110; 477/111

(58) Field of Classification Search ........ 74/335, 74/745; 477/107, 110, 111
See application file for complete search history.

(56) References Cited

U.S. PATENT DOCUMENTS

| 6,095,947 | A | 8/2000 | Genise | 477/124 |
| 6,105,449 | A | 8/2000 | Genise et al. | 74/335 |
| 6,123,643 | A | 9/2000 | Davis et al. | 477/92 |
| 6,439,082 | B1 * | 8/2002 | Onuki | 74/745 |
| 6,463,823 | B1 * | 10/2002 | Walker | 74/335 |
| 6,473,680 | B1 * | 10/2002 | Nishimura | 701/54 |
| 6,500,093 | B1 * | 12/2002 | Genise et al. | 477/109 |
| 6,524,221 | B1 * | 2/2003 | Nishimura | 477/97 |
| 6,536,569 | B1 * | 3/2003 | Nishimura | 192/3.58 |
| 6,634,983 | B1 * | 10/2003 | Nishimura | 477/85 |

FOREIGN PATENT DOCUMENTS

| DE | 100 29 497 A1 | 1/2002 |
| EP | 1 035 357 A1 | 9/2000 |

* cited by examiner

*Primary Examiner*—Tisha Lewis
(74) *Attorney, Agent, or Firm*—Davis & Bujold, P.L.L.C.

(57) ABSTRACT

In an automated multi-group transmission consisting of one front-mounted group, one main group and one range group and in which the front-mounted group transmission and the range group transmission comprise a first shifting position for a low-speed total transmission ratio, a second shifting position for a high-speed total transmission ratio and a third shifting position as neutral position for interrupting the torque transmission, in a gear-shifting method for gear change, the range group transmission and the front-mounted group transmission are simultaneously brought to their respective neutral shifting position, which makes it possible to shift a deceleration of the main transmission. With the start of the gear-shifting process in the neutral positions, there also begins the control of the engine rotational speed to the total ratio of the target gear.

7 Claims, 1 Drawing Sheet

GEAR-SHIFTING METHOD FOR MULTI-GROUP GEARBOXES

This application is a national stage completion of PCT/EP02/11811 filed Oct. 23, 2002 which claims priority from German Application Serial No. 101 52 857.4 filed Oct. 25, 2001.

FIELD OF THE INVENTION

The instant invention relates to a method for gear-shifting a multi-group transmission.

BACKGROUND OF THE INVENTION

Transmissions for industrial motor vehicles often have twelve, sixteen or more gears. Such multi-ratio transmissions are mostly configured as multi-group transmissions which divide into a front-mounted group, a main group and a range group. Most of these transmissions have an automated gear-shifting device in order to simplify the complex shifting cycle created by the multiplicity of gears. The gear shifts in the main transmission are manually carried out by the driver. Multiple gear-shifting elements are also provided in the gear-shifting process, which have to be harmonized with each other, and different protection mechanisms to protect the transmission from erroneous gear shifts. At the same time, in traditional models the range group is, as a rule, synchronically shifted with the aid of gear-shifting elements, locking synchronization mechanisms or powershift clutches.

German patent application P 100 29 497 has disclosed a pneumatic gear-shifting device with protection mechanisms from erroneous movements in the gear selection. A transmission is described with a mechanical interlock where the selector rods in the main transmission are blocked mechanically or via a locking bolt when the selector rods of a group transmission are not in one of their two final positions. This occurs via adequately laid out slanting on the selector rod of the group transmission. This function should ensure that the gear shift in the group transmission is terminated before the main transmission gear shift and the synchronizer process connected therewith follow. There is further provided a pneumatic-mechanical gate interlock which is activated by one signal of the output shaft rotational speed, in order to block the selection movement for shifting an inadmissible gear. Between the individual shift gates, a bump detent is further provided for insurance against inadvertent shifting of the group transmission.

Those protective precautions and mechanisms, however, act disadvantageously on the shifting comfort. Strong manual shifting forces, interfering shifting noises and a shifting movement not flexible enough are produced. The driver often finds a bump detent in the shift gates irritating. In addition, the protective measures cause the increase of the total costs for the transmission.

The individual groups of the multi-group transmission certainly can be shifted by an external rotational speed command without consequent problems. But such successive shifting of the individual groups result in extremely long shifting periods. In a 16-gear transmission for shifting from the $8^{th}$ gear to the $9^{th}$ gear, the front-mounted group is first shifted with participation of the transmission brake from the low-speed ratio to the high-speed ratio of the transmission. Thereafter, by the actuation of a clutch, the main transmission is shifted from the fourth ratio step to the first ratio step and finally from the slow ratio to the quick ratio range group.

The problem on which this invention is based is to provide for gear a method shifting a multi-group transmission which abbreviates the shifting periods, reduces the shifting force required, prevents shifting noises and simplifies the gear shifting process altogether.

This problem is solved by a gear-shifting method according to the characteristic features of claim 1. Other variations are explained in the sub-claims.

SUMMARY OF THE INVENTION

The method is based on an automated multi-group transmission which comprises one front-mounted group, one main group and one range group. In this transmission are provided in the front-mounted group transmission and the range group transmission a first shifting position for a slow total gear ratio, a second shifting position for a quick total gear ratio and a third shifting position as neutral position for interrupting the torque transmission. During a gear change, which includes one shifting of the range group, the range group transmission and the front-mounted group transmission are simultaneously brought to their respective neutral shifting position. A deceleration of the main transmission is thereby made possible for carrying out the gear-shifting process. With the start of the gear shifting process in the neutral positions, the control of the engine rotational speed also sets at the total ratio of the target gear.

At the same time, the range group transmission and the main transmission are preferably dog-clutch engaged and the front-mounted transmission is synchronized shifted. The separation of the primary side of the main transmission at the input by the neutral shifting position of the range group allow a deceleration of the main transmission for the shifting process. The main transmission, i.e., the countershaft, the idler wheels and the main shaft, can be braked by a brake acting upon the countershaft. The main transmission can be separated from the transmission exit also by a displacement of the tooth contract between sun wheel and planetary gear in the case of a planetary transmission.

Below an empirically determined rotational speed level on the idler wheel to be engaged of a target gear desired to be shifted in the main transmission, the engagement thereof is noiseless even without a synchronizer device. This is also the case when the main transmission is engaged via a dog clutch.

After the main transmission has been brought to the target shifting position of the gear intended to be engaged, the front-mounted group is engaged in its correspondingly required target shifting position. At the same time, the front-mounted group is engaged synchronized. As soon as the total ratio of the target gear has been brought to synchronous speed, the range group is brought to the required shifting position. The individual shifting positions, for example, can be monitored and evaluated by a transmission electronic system and the corresponding method steps can be introduced.

The adjustment of the engine rotational speed to a total ratio of the target gear starts with the beginning of the shifting process, that is, with the engagement of the front-mounted group and of the range group in their neutral shifting positions. At the same time, the separating clutch of the main and range transmissions can either remain closed while the groups disengage, via the load cycle for gear shifting, or remain open and thereafter be closed.

Gear-shifting processes in which the range group transmission takes no part, that is, in which the shifting position of the range group is identical before and after the gear shifting, are carried out in traditional manner. Therefore, they can result as engine and brake guided dog clutch engagements.

With the inventive gear-shifting method a noiseless shifting in the main transmission is possible without compensating the differential rotational speed, since the gear shifting is effected at low absolute rotational speeds. By virtue of the dog clutch gear shifting of the range groups, no synchronization is needed for this whereby the costs for the total transmission becomes reduced. In addition, the magnitudes of the actuating forces for the main transmission and the range group can be unified. The shifting process is altogether simplified by the method of this invention and the time period required for gear shifting is shortened.

BRIEF DESCRIPTION OF THE DRAWING

The invention will now be described, by way of example, with reference to the accompanying drawings in which.

DETAILED DESCRIPTION OF THE INVENTION

Figure 1:
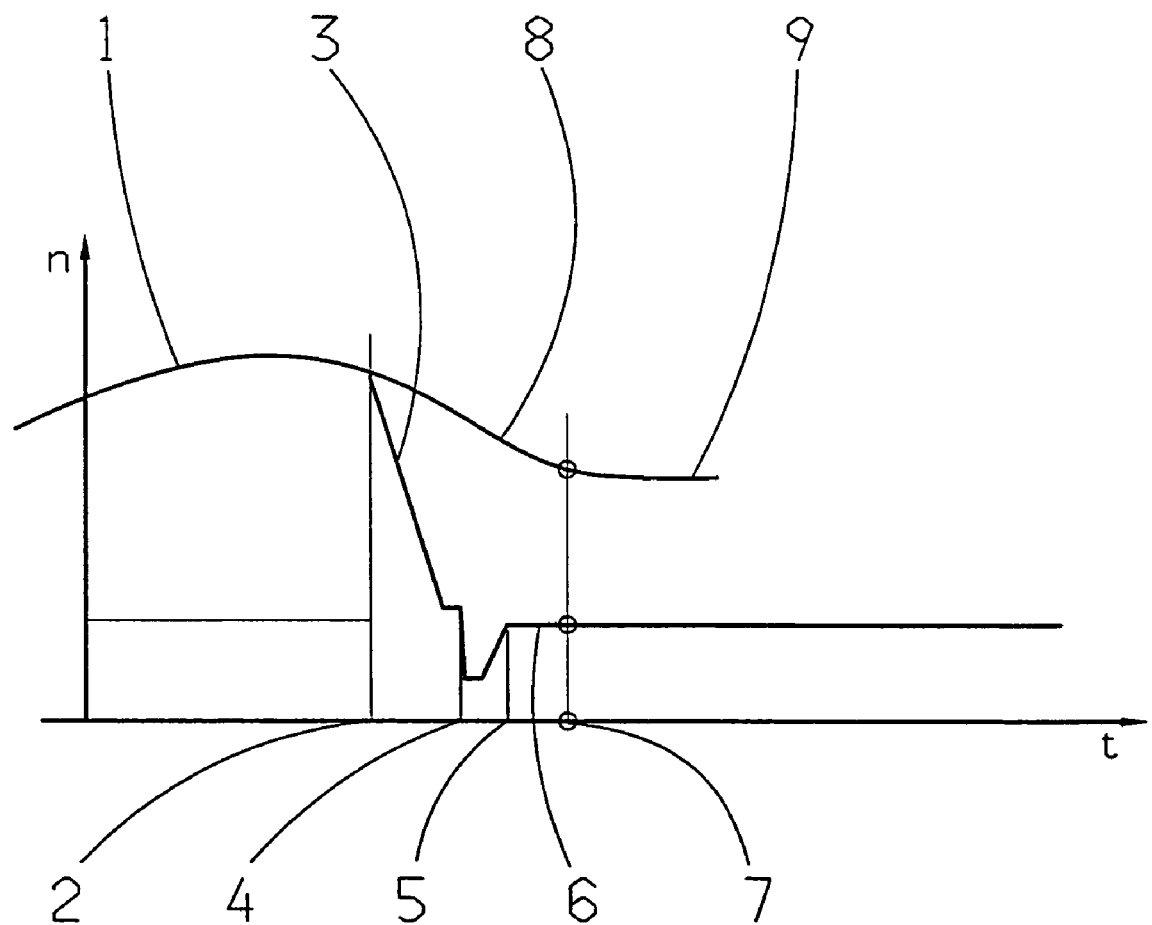
FIG. 1 shows a periodic curve of the rotational speed in a gear-shifting method according to the invention.

A gear-shifting method is described with reference to the change from an $8^{th}$ to a $10^{th}$ gear of a 16-gear multi-group transmission. In the course of curve range 1, the transmission moves in the $8^{th}$ gear, the rotational speed increasing also as the velocity increases and an upshift becomes necessary. At a moment 2, the gear-shifting process begins, that is, a front-mounted group and a range group assume their neutral position; the main transmission being decelerated and the control of the engine rotational speed upon the total ratio of the target gear begins, as a curve range 3 shows.

At a moment 4, a main transmission is brought to a target gear-shifting position and a carrying out of a gear-shifting is fed back to an electronic system. Thereupon, at a moment 5, a front-mounted group is shifted to its target gear-shifting position and a synchronization is achieved with a total ratio, as shown in curve range 6. The performance of this method step is, likewise, fed back to the electronic system. At a moment 7, a range group is brought to its target gear-shifting position.

The gear-shifting process is terminated therewith. The total engine rotational speed behaves during the gear-shifting process according to the course shown in the curve range 8. After terminating the gear-shifting, the vehicle moves to a $10^{th}$ gear at a lower rotational speed compared to the curve section 1, as shown in a curve range 9.

A corresponding curve results at every upshift in which the range group takes part. The shifting to a lower gear results similarly. At the same time, by lowering of the driving velocity and the rotational speed consequently dropping, a downshift is required. For this the front-mounted group and the range group are again brought to their neutral position. The engine rotational speed is then brought to the total ratio of the desired lower gear and then the main transmission to the corresponding gear.

After this gear-shifting process is fed back to the electronic system, the front-mounted group and then the range group are brought to a suitable target gear-shifting position.

As can be seen from this description with the gear-shifting method, one or more gear steps can be skipped without a problem; no danger of an erroneous gear shifting results.

REFERENCE NUMERALS

1 rotational speed $8^{th}$ gear (curve range)
2 gear-shifting start (moment)
3 deceleration of main transmission (curve range)
4 shifting of the main transmission (moment)
5 shifting of front-mounted group (moment)
6 synchronization (curve range)
7 shifting of range group (moment)
8 rotational speed during shifting process (curve range)
9 rotational speed $10^{th}$ gear (curve range)

The invention claimed is:

1. A method for gear-shifting an automated multi-group transmission comprising:
    a front-mounted group;
    a main group; and
    a range group;
    wherein said front-mounted group and said range group comprise:
        a shifting position for a low-speed total ratio;
        a second shifting position for a high-speed total ratio; and
        a third neutral shifting position for interrupting torque transmission;
    during a gear change, which includes shifting of the range group, the range group and the front-mounted group are simultaneously brought to the neutral shifting position whereby a deceleration of the main group for gear-shifting is possible and, with the start of a gear-shifting process in the neutral shifting position, control of an engine rotational speed to a total ratio of a target gear also begins.

2. The method for gear-shifting of a multi-group transmission according to claim 1, further comprising the step of decelerating the main group by a brake actuating upon a countershaft of the main group.

3. The method for gear-shifting of a multi-group transmission according to claim 1, further comprising the step of shifting the main group and the range group via dog clutches and synchronize shifting the front-mounted group.

4. The method for gear-shifting of a multi-group transmission according to claim 1, further comprising the step of, after gear-shifting of the main group to a target shifting position, shifting the front-mounted group to its target shifting position.

5. The method for gear-shifting of a multi-group transmission according to claim 1, further comprising the step of, after shifting of said front-mounted group to a target shifting position and after reaching synchronization with the total ratio of the target gear, shifting the range group is to its target shifting position.

6. The method for gear-shifting of a multi-group transmission according to claim 1, further comprising the step of allowing a separating clutch to remain closed for gear shifting during disengagement of the transmission groups.

7. The method for gear-shifting of a multi-group transmission according to claim 1, further comprising the step of allowing a separating clutch to remain open during disengagement of the transmission groups and thereafter closing the separating clutch.

* * * * *